United States Patent
Riley

(10) Patent No.: US 6,484,702 B1
(45) Date of Patent: Nov. 26, 2002

(54) EGR SYSTEM USING SELECTIVE FUEL AND ERG SUPPLY SCHEDULING

(75) Inventor: Timothy James Riley, Essex (GB)

(73) Assignee: Ford Global Technologies, Inc., Dearborn, MI (US)

( * ) Notice: Subject to any disclaimer, the term of this patent is extended or adjusted under 35 U.S.C. 154(b) by 8 days.

(21) Appl. No.: 09/648,685

(22) Filed: Aug. 25, 2000

(51) Int. Cl.$^7$ ................................................ F02B 47/08
(52) U.S. Cl. ............................ 123/568.11; 123/568.21; 701/104; 701/108
(58) Field of Search ................. 123/568.11, 568.22, 123/481, 198 DB, 198 D, 198 F, 568.13, 568.17, 568.18, 568.2, 568.21, 698, 472; 701/104, 108

(56) References Cited

U.S. PATENT DOCUMENTS

| | | | |
|---|---|---|---|
| 4,192,278 A | * 3/1980 | Iizuka et al. | 123/198 F |
| 4,292,938 A | * 10/1981 | Tanaka et al. | 123/198 F |
| 4,313,406 A | * 2/1982 | Iizuka et al. | 123/198 F |
| 4,344,393 A | * 8/1982 | Etoh et al. | 123/198 F |
| 4,475,525 A | 10/1984 | Fukae | |
| 5,189,876 A | 3/1993 | Hirota et al. | |
| 5,546,915 A | 8/1996 | Isobe | |
| 5,562,086 A | * 10/1996 | Asada et al. | 123/198 F |
| 5,875,743 A | 3/1999 | Dickey | |
| 5,894,726 A | * 4/1999 | Monnier | 123/443 |

FOREIGN PATENT DOCUMENTS

DE 10135482 * 3/2002 .......... F02M/25/07

OTHER PUBLICATIONS

US 6,095,122, 8/2000, Everingham (withdrawn)*

* cited by examiner

Primary Examiner—Terry M. Argenbright
Assistant Examiner—Hai H. Huynh
(74) Attorney, Agent, or Firm—Artz & Artz; Carlos L. Hanze

(57) ABSTRACT

A method for reducing engine deposits in an internal combustion engine, using selective fuel and EGR supply scheduling, is provided including an engine having a first and second plurality of cylinders. A fuel injection system for injecting fuel into both of the first and second plurality of cylinders is located on the engine. An exhaust gas recirculation system supplies a portion of the exhaust gases from the engine to both of the first and second plurality of cylinders. During operation, the engine repeatedly combusts fuel in both of the first and second plurality of cylinders. Additional fuel is supplied to one or more selected cylinders following each combustion cycle while recirculated exhaust gases are supplied from a remaining plurality of cylinders, preventing interaction of post-combustion injected and recirculated exhaust gases and reducing deposition of undesirable material.

19 Claims, 2 Drawing Sheets

EGR SYSTEM USING SELECTIVE FUEL AND ERG SUPPLY SCHEDULING

TECHNICAL FIELD

The present invention relates to automotive powertrain systems. More particularly, the present invention relates to an exhaust gas recirculation system using selective fuel and EGR supply scheduling.

BACKGROUND ART

The exhaust gas of internal combustion engines contains various amounts of unburned hydrocarbons, carbon monoxide and nitrogen oxides. Emission of these materials to the atmosphere is undesirable. The problem is more acute in urban areas having a high concentration of motor vehicles. During recent years, researchers have investigated extensively means of reducing exhaust emissions. This research has been quite fruitful. As a result, present-day automobiles emit only a fraction of undesirable materials compared to those of less than a decade ago.

There are many methods for reducing exhaust emissions. One such method is exhaust gas recirculation (EGR) systems. These systems are employed in automotive vehicles in order to help reduce nitrous oxide emissions. Such systems typically employ an EGR valve that is disposed between the engine exhaust manifold and the engine intake manifold, and operable, when in an open position, to recirculate exhaust gas from the exhaust side of the engine back to the intake side. Unfortunately, components left in the exhaust gas due to incomplete combustion may leave deposits within the EGR, induction, and combustion systems. Unburned carbon or other substances contained in the exhaust gas tend to stick to and deposit on surfaces exposed to these exhaust gases. This undesired accumulation could result in reduced engine life and performance.

Another technique for reducing emissions involves injecting fuel into an engine cylinder during a post-combustion time period. This post-combustion injected fuel acts as a reductant for the operation of lean nitrogen oxide catalysis to reduce internal combustion engine nitrogen oxide emissions. However, the combination of EGR with post-combustion injection of fuel to reduce nitrous oxide emissions tends to compound the problem with EGR systems. The interaction of post injected fuel and EGR may increase the level of deposition within the EGR, induction, and combustion systems. Because of the nature of their combustion process, this problem is particularly acute in diesel engines.

The disadvantages associated with these conventional EGR systems using post-combustion fuel injection techniques have made it apparent that a new technique for EGR and fuel injection scheduling is needed. The new technique should reduce the amount of undesirable unburned carbon or other substances contained in the exhaust gas from depositing on the EGR, induction, and combustion systems. Additionally, the new technique should increase overall engine life and performance while reducing long term emissions. The present invention is directed to these ends.

SUMMARY OF THE INVENTION

It is, therefore, an object of the invention to provide an improved and reliable EGR system using selective fuel and EGR supply scheduling. Another object of the invention is to reduce the amount of undesirable unburned carbon and other substances contained in the exhaust gas from depositing on the EGR, induction, and combustion systems.

In accordance with the objects of this invention, an EGR system using selective fuel and EGR supply scheduling is provided. In one embodiment of the invention, a method for reducing engine deposits in an internal combustion engine, using selective fuel and EGR supply scheduling, includes an engine having a first and second plurality of cylinders. A fuel injection system for injecting fuel into both of said first and second plurality of cylinders is located on the engine. The engine also includes an exhaust gas recirculation system for supplying a portion of the exhaust gases from the engine to both of the first and second plurality of cylinders. During operation, the engine repeatedly combusts fuel in both of the first and second plurality of cylinders. In accordance with the present invention additional fuel is supplied to one or more selected cylinders following each combustion cycle while recirculated exhaust gases are supplied to the remaining plurality of cylinders. In this way, the interaction of post-combustion injected fuel and recirculated exhaust gases is prevented and the amount of deposition of undesirable materials in the engine is reduced.

The present invention thus achieves an improved EGR system using selective fuel and EGR supply scheduling. The present invention is advantageous in that overall engine life and performance is increased while reducing long term emissions.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
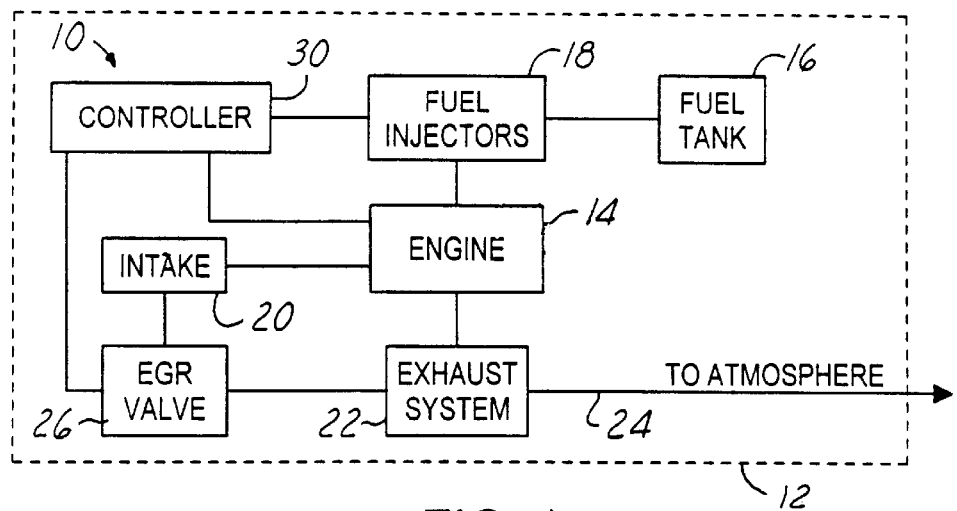
FIG. 1 is a block diagram of an EGR system using selective fuel and EGR supply scheduling in accordance with one embodiment of the present invention.

In the following figures, the same reference numerals will be used to identify identical components in the various views. The present invention is illustrated with respect to an exhaust gas recirculation (EGR) system using selective fuel and EGR supply scheduling particularly suited for the automotive field. However, the present invention is applicable to various other uses that may require EGR systems using selective fuel and EGR supply scheduling.

Referring to FIG. 1, a block diagram of an EGR system 10 using selective fuel and EGR supply scheduling in accordance with one embodiment of the present invention is illustrated. EGR system 10 is located in a vehicle 12 having an internal combustion engine 14 and a fuel tank 16 holding a supply of fuel. A plurality of fuel injectors 18 receive fuel from fuel tank 16 and supply the fuel to at least two cylinders of internal combustion engine 14 during engine operation. Each cylinder has at least one or more fuel injectors 18. Engine 14 also includes an intake manifold 20 for supplying air for the combustion process and an exhaust manifold 22 for removing exhaust gases. Each cylinder has at least one or more intake ports and exhaust ports. Exhaust manifold 22 is coupled to an exhaust pipe 24 by which the exhaust gases are removed from vehicle 12 and vented to the atmosphere.

An EGR valve 26 is disposed between exhaust manifold 22 and intake manifold 26. EGR valve 26 is operable, when in an open position, to recirculate exhaust gas from the exhaust 22 of the engine back to the intake 20. An EGR valve 26 is employed in vehicle 12 in order to help reduce various engine emissions. An actuator is employed for moving the EGR valve 26 between its open and closed positions, with the recirculation of exhaust gas being appropriate only at certain times. Typically, the appropriate time for recirculation is when the vehicle 12 is traveling at lower speeds, when the pressure at the intake 20 of the engine 14 is less than the pressure at the exhaust 22 of the engine 14. One skilled in the art would realize that exhaust gases might be supplied from either the exhaust ports in the cylinders or from the exhaust manifold.

A controller 30 is located in vehicle 12 and controls the function of engine 14. Controller 30 is also coupled to and controls fuel injectors 18 and EGR valve 26. To help reduce various engine emissions, controller 30 includes control logic operative to inject small quantities of fuel into the cylinders after the combustion process is completed in each cylinder. This additional fuel acts as a reductant for the operation of lean NOx catalysis to reduce undesirable NOx emissions. The interaction of post-combustion injected fuel and EGR increases the deposits of carbon and other substances within EGR, air induction and combustion (cylinders, exhaust, etc.) systems.

Because an increase in deposition levels degrades engine performance and emission levels, the present invention selectively schedules post-combustion fuel injection to one or more cylinders, while supplying engine gas recalculation to cylinders not scheduled for post-combustion fuel injection. In this way, the interaction of post-combustion injected fuel and EGR is eliminated and the deposits of carbon and other substances within EGR, air induction and combustion (cylinders, exhaust, etc.) systems is reduced.

Figure 2:
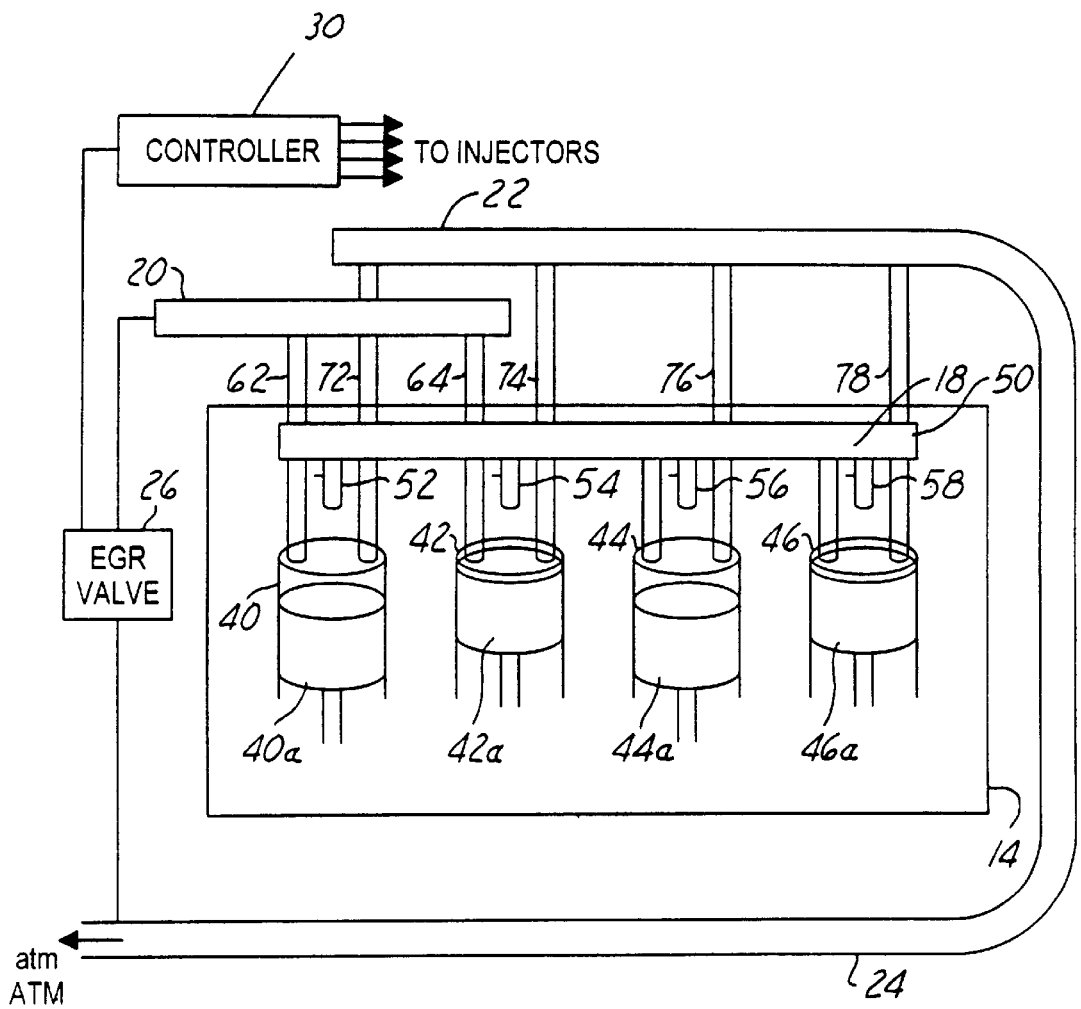
FIG. 2 is a depiction of an EGR system using selective fuel and EGR supply scheduling in accordance with one embodiment of the present invention.

Referring to FIG. 2, an EGR system 10 using selective fuel and EGR supply scheduling in accordance with one embodiment of the present invention is illustrated. EGR system 10 includes an internal combustion engine 14 having a plurality of fuel injectors 52, 54, 56, 58 fluidly coupled to a fuel rail 50 located on engine 14. Each fuel injector 52, 54, 56, 58 supplies fuel to a corresponding cylinder 40, 42, 44, 46 of internal combustion engine 14 during engine operation. The operation of each of the fuel injectors 52, 54, 56, 58 is conducted by the controller 30 in a conventional manner, i.e., each injector 52, 54, 56, 58 may be operated individually.

Each of the cylinders includes a piston 40A, 42A, 44A, and 46A. Engine 14 also includes an intake manifold 20 for supplying air for the combustion process. Air is supplied to each cylinder 40, 42, 44, 46 through corresponding intake ports 62, 64. Engine 14 also includes and an exhaust manifold 22 for removing exhaust gases through corresponding exhaust ports 72, 74, 76, 78. One skilled in the art would realize that each cylinder may have more than one intake port and exhaust port. Exhaust manifold 22 is coupled to an exhaust pipe 24 by which the exhaust gases are removed from vehicle 12 and vented to the atmosphere.

An EGR valve 26 is disposed between exhaust manifold 22 and intake manifold 26. EGR valve 26 is operable, when in an open position, to recirculate exhaust gas from the exhaust 22 of the engine back to the intake 20. EGR valve 26 is employed in vehicle 12 in order to help reduce various engine emissions. An actuator is employed for moving the EGR valve 26 between its open and closed positions, with the recirculation of exhaust gas being appropriate only at certain times. Typically, the appropriate time for recirculation is when the vehicle 12 is traveling at lower speeds, when the pressure at the intake 20 of the engine 14 is less than the pressure at the exhaust 22 of the engine 14. One skilled in the art would realize that exhaust gases might be supplied from either the exhaust ports in the cylinders or from the exhaust manifold. Also, while the present invention is illustrated using a single EGR valve 26, one skilled in the art would recognize that a separate EGR valve for each cylinder might be used.

In operation, controller 30 uses selective fuel and EGR supply scheduling by separating post-combustion injected fuel and EGR timing. This is done by activating fuel injectors 56 and 58 to inject fuel into a first plurality of cylinders 44 and 46. This occurs during a post-combustion period to act as a reductant for the operation of lean nitrogen oxide catalysis to reduce internal combustion engine nitrogen oxide emissions. While this is happening, controller 30 activates EGR valve 26 to allow exhaust gasses to recirculate from the exhaust manifold 22 into a second plurality of cylinders 40 and 42 through intake runners 62 and 64. Therefore, recirculated exhaust gases and post-combustion injected fuel are separated.

Figure 3:
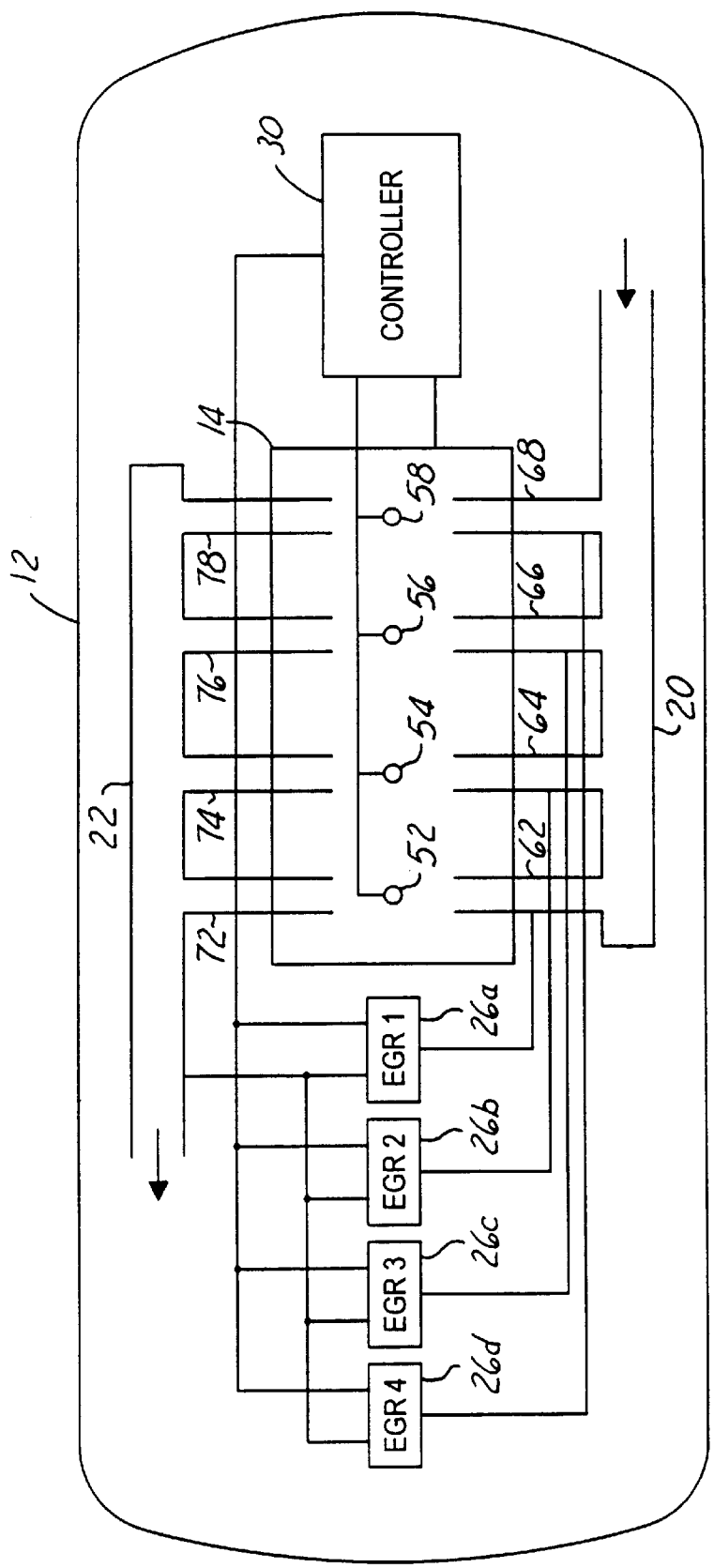
FIG. 3 is a depiction of an EGR system with individual EGR valves using selective fuel and EGR supply scheduling in accordance with one embodiment of the present invention.

Referring to FIG. 3, an EGR system 10 with individual EGR valves using selective fuel and EGR supply scheduling in accordance with one embodiment of the present invention is illustrated. EGR system 10 includes an internal combustion engine 14 having a plurality of fuel injectors 52, 54, 56, 58 electronically coupled to a controller 30. The operation of each of the fuel injectors 52, 54, 56, 58 is conducted by the controller 30 in a conventional manner, i.e., each injector 52, 54, 56, 58 may be operated individually.

Engine 14 also includes an intake manifold 20 for supplying air for the combustion process. Air is supplied to each cylinder (best shown in FIG. 2) through corresponding intake ports 62, 64, 66, and 68. Engine 14 also includes and an exhaust manifold 22 for removing exhaust gases through corresponding exhaust ports 72, 74, 76, 78. One skilled in the art would realize that each cylinder may have more than one intake port and exhaust port.

A plurality of EGR valves 26a, 26b, 26c, 26d are correspondingly disposed between exhaust manifold 22 and each intake ports 62, 64, 66, and 68. EGR valves 26a, 26b, 26c, and 26d are controlled by controller 30 and are operable, when in an open position, to recirculate exhaust gas from the exhaust manifold 22 of the engine individually back to intake ports 62, 64, 66, and 68. One skilled in the art would realize that exhaust gases might be supplied from either the exhaust ports in the cylinders or from the exhaust manifold.

In operation, controller 30 uses selective fuel and EGR supply scheduling by separating post-combustion injected fuel and exhaust gasses. Controller 30 directs one or more fuel injectors 52, 54, 56 or 58 individually to inject fuel into one or more corresponding cylinders based on predetermined engine conditions. This occurs during a post-combustion period to act as a reductant for the operation of lean nitrogen oxide catalysis to reduce internal combustion engine nitrogen oxide emissions. While this is happening, controller 30 activates one or more EGR valves 26a, 26b, 26c, 26d to allow exhaust gasses to recirculate from the exhaust manifold 22 into one or more cylinders not receiving post-combustion fuel injection. Therefore, recirculated exhaust gases and post-combustion injected fuel are separated.

The present invention thus achieves an improved and reliable EGR system using selective fuel and EGR supply scheduling by separating post-combustion injected fuel and EGR. The present invention reduces the amount of undesirable unburned carbon and other substances contained in the exhaust gas from depositing on the EGR, induction, and combustion systems. Additionally, the present invention increases overall engine life and performance while reducing long term emissions.

From the foregoing, it can be seen that there has been brought to the art a new and improved EGR system using selective fuel and EGR supply scheduling. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A method for reducing engine deposits to an internal combustion engine, said engine having a first plurality of cylinders, a second plurality of cylinders, a fuel injection system for injecting fuel into both of said first and second plurality of cylinders, and an exhaust gas recirculation system for supplying a portion of the exhaust gases from the engine to both of said first and second plurality of cylinders, the method comprising the steps of:
   operating the engine to repeatedly combust fuel in both of said first and second plurality of cylinders;
   supplying additional fuel to said first plurality of cylinders following each combustion of fuel therein; and
   supplying recirculated exhaust gases to said second plurality of cylinders, wherein the interaction of post combustion injected fuel and recirculated exhaust gases is prevented and the amount of deposition of undesirable materials in the engine is reduced.

2. The method as set forth in claim 1, wherein said recirculated exhaust gases are supplied to said second plurality of cylinders through an air intake system.

3. The method as set forth in claim 1, wherein the exhaust gases for the exhaust gas recirculation system are supplied from exhaust ports in the cylinders.

4. The method as set forth in claim 1, wherein the exhaust gases are supplied from the exhaust manifold.

5. The method as set forth in claim 1, further comprising the step of selectively scheduling post-combustion injection to at least one of said cylinders.

6. The method as set forth in claim 5, further comprising the step of selectively scheduling exhaust gas recirculation to all cylinders not selectively scheduled for post-combustion injection.

7. The method as set forth in claim 1, further comprising the step of supplying recirculated exhaust gases on an individual basis, separately into each of said second plurality of cylinders, wherein the interaction of post combustion injected fuel and recirculated exhaust gases is prevented and the amount of deposition of undesirable materials in the engine is reduced.

8. An apparatus for reducing deposits of material in an internal combustion engine, the engine having a plurality of cylinders with each cylinder having a combustion chamber, at least one intake port and at least one exhaust port, said apparatus comprising:
   a fuel injector mechanism for controllably delivering fuel to the combustion chamber of each said cylinders;
   an exhaust gas recirculation mechanism for controllably delivering recirculated exhaust gases to each of said cylinders; and
   an electronic control unit in electrical communication with said fuel injector mechanism, exhaust gas recirculation mechanism and engine, said electronic control unit being adapted to deliver an electronic signal to said fuel injector mechanism for injecting fuel subsequent to combustion to only a first plurality of cylinders and, at the same time, being adapted to deliver an electronic signal to said exhaust gas recirculation mechanism for supplying recirculated exhaust gas to only a second plurality of cylinders.

9. The apparatus as set forth in claim 8, further comprising an exhaust manifold in communication with each of said exhaust ports in said cylinders, wherein exhaust gas for recirculation are supplied from said exhaust manifold.

10. The apparatus as set forth in claim 8, wherein said recirculated exhaust gases are supplied to said second plurality of cylinders through an air intake system.

11. The apparatus as set forth in claim 8, wherein the exhaust gases for the exhaust gas recirculation system are supplied from exhaust ports in the cylinders.

12. The apparatus as set forth in claim 8, wherein said controller includes control logic operative to selectively schedule post-combustion injection to at least one of said cylinders.

13. The apparatus as set forth in claim 12, wherein said controller includes control logic operative to selectively schedule exhaust gas recirculation to all cylinders not selectively scheduled for post-combustion injection.

14. The apparatus as set forth in claim 8, wherein said controller includes control logic operative to supply recirculated exhaust gases on an individual basis, separately into each of said second plurality of cylinders, wherein the interaction of post combustion injected fuel and recirculated exhaust gases is prevented and the amount of deposition of undesirable materials in the engine is reduced.

15. The apparatus as set forth in claim 8, further comprising a plurality of exhaust gas recirculation mechanisms for controllably delivering recirculated exhaust gases to each of said cylinders, at least one of each exhaust gas recirculation mechanisms corresponding to one of each of said plurality of cylinders, whereby exhaust gas recirculation is selectively controlled for each individual cylinder.

16. An apparatus for reducing deposits of material in an internal combustion engine, the engine having a plurality of cylinders with each cylinder having a combustion chamber, at least one intake port and at least one exhaust port, said apparatus comprising:
   a plurality of fuel injectors for controllably delivering fuel to the combustion chamber of each said cylinders, at least one of said plurality of fuel injectors correspondingly coupled to each of said cylinders;
   a plurality of exhaust gas recirculation valves for controllably delivering recirculated exhaust gases to each of said cylinders, at least one of said exhaust gas recirculation valves correspondingly coupled to each of said cylinders and an electronic control unit in electrical communication with said fuel injectors, exhaust gas recirculation valves, and engine, said electronic control unit being adapted to deliver an electronic signal to said fuel injectors for injecting fuel subsequent to combustion to only a first plurality of cylinders and, at the same time, being adapted to deliver an electronic signal to said exhaust gas recirculation valves for supplying recirculated exhaust gas to only a second plurality of cylinders.

17. The apparatus as set forth in claim 16, further comprising an exhaust manifold in communication with each of said exhaust ports in said cylinders, wherein exhaust gas for recirculation are supplied from said exhaust manifold.

18. The apparatus as set forth in claim 16, wherein said recirculated exhaust gases are supplied to said second plurality of cylinders through an air intake system.

19. The apparatus as set forth in claim 16, wherein the exhaust gases for the exhaust gas recirculation system are supplied from exhaust ports in the cylinders.

* * * * *